United States Patent Office

3,652,721
Patented Mar. 28, 1972

3,652,721
NOVEL GRAFT COPOLYMER BLENDS WITH TWO DIFFERENT PARTICLE SIZES AND METHOD OF MAKING SAME
William O. Dalton, Hampden, and Quirino A. Trementozzi, Springfield, Mass., assignor to Monsanto Company, St. Louis, Mo.
No Drawing. Filed July 24, 1970, Ser. No. 58,154
Int. Cl. C08f 41/12, 37/18
U.S. Cl. 260—876 R                                15 Claims

ABSTRACT OF THE DISCLOSURE

A latex of a rubbery polymer having a particle size of less than 0.25 micron is agglomerated by use of an organic acid anhydride to a particle size of 0.35–1.2 micron and of relatively narrow size distribution. This agglomerated rubber is subjected to grafting with a vinylidene monomer formulation. The final polyblend also contains a larger amount of small particle rubbery polymer also grafted with the vinylidene monomer formulation and a matrix of vinylidene polymer.

BACKGROUND OF THE INVENTION

As is well known, graft polyblends of rubbers with various vinylidene polymers have advantages in providing compositions of desirable toughness, chemical resistance and good formability. ABS polyblends have proven particularly advantageous in many application, and modifications of such ABS polyblends include the substitution of alkyl acrylate esters for a portion of the vinylidene monomer components, variations of the ratio of styrene-type and acrylonitrile-type monomers and the use of saturated rubbers such as acrylate rubbers as the substrate for the graft.

In the U.S. Pat. No. 3,509,238, granted Apr. 28, 1970 to Aubrey and Jastrzebski, there is disclosed and claimed an ABS-type polyblend containing graft copolymers having distinct degrees of grafting to provide a highly desirable balance of properties, the lowly grafted polymer apparently tending to cluster and simulate a larger particle size graft copolymer to provide a very high degree of impact resistance. In U.S. Pat. No. 3,509,237 granted to Norman E. Aubrey on Apr. 28, 1970, there is disclosed and claimed an ABS-type polyblend wherein there are graft copolymer particles of relative small size and other graft copolymer particles of relatively large size. A relatively small amount of the large particles provides greatly enhanced impact resistance in combination with the small particles while the larger amount of the smaller particles extends the effectiveness of the large particles to levels which larger amounts of either do not provide. Additionally, the volume of small particles masks the undesirable effects of the large particles upon the overall balance of properties.

The concepts of the aforementioned patents have been widely employed in commercial compositions. In the commercial use of the concept of the latter of the above mentioned patents, the large particle component has been provided by a mass/suspension polymerization process and the smaller particle component has been provided by an emulsion polymerization process. There has been a desire to prepare both components by emulsion processes, mostly desirably in a single reactor, in an effort to minimize cost. However, grafts of purchased latices having a large average particle size have not proven so effective as the mass/suspension graft copolymers.

It is an object of the present invention to provide a novel polymerized polyblend of emulsion polymerized graft copolymers having different particle sizes and affording a highly desirable balance of properties.

It is also an object to provide a process for making such polyblends of emulsion graft copolymers which is relatively simple and economical in operation and which is adapted to facile variation to accommodate variations in particle size and grafting level.

Another object is to provide such polyblends which may be produced in a single reactor and in a single graft polymerization cycle.

SUMMARY OF THE INVENTION

It has now been found that the foregoing and related objects can be readily attained in a composition comprising a polyblend of (A) a matrix of a polymer containing a vinylidene monomer; (B) a first graft copolymer having a rubber substrate and a superstrate of a polymer containing the vinylidene monomer, the rubber substrate having a particle size ($D_w$), based upon weight average, of not more than 0.25 micron; and (C) a second graft copolymer having a rubber substrate with a diene monomer component and a superstrate of a polymer containing the vinylidene monomer, the rubber substrate having a particle size ($D_w$), based upon weight average, of 0.35–1.0 micron. This rubber substrate is an agglomerate of smaller particles and has a narrow particle size distribution with at least 70 percent by weight of the particles being within the range 0.75 $D_w$–1.2 $D_w$. Both of the graft copolymers are emulsion graft copolymers; the first has a superstrate to substrate ratio of 45–100:100 and the second has a ratio of 10–45:100. The two graft copolymers combined comprise 1.0–70.0 percent by weight of the polyblend and the first graft copolymer comprises 55.0–85.0 percent by weight of the combined weight of the graft copolymers.

The polyblend is produced by a process wherein an aqueous latex of a rubbery polymer having a diene monomer component is agglomerated by: (i) adding thereto a water-soluble organic acid anhydride having an ionization constant which is higher than that of the organic fatty acid of a soap emulsifying agent for the latex, (ii) allowing the latex to stand to permit agglomeration of the rubber particles to a size ($D_w$), based upon weight average, of 0.35–1.0 micron with a narrow particle size distribution in which at least 70 percent by weight of the particles are within the range of 0.75 $D_w$–1.2 $D_w$, and (iii) stabilizing the agglomerated latex with emulsifying agent. There is then polymerized in the presence of the agglomerated latex particles a polymerizable vinylidene monomer formulation to produce grafting of at least a portion of the polymer being formed onto the rubbery polymer, the superstrate to substrate ratio being 10–45:100. A polymerizable vinylidene monomer formulation containing the vinylidene monomer is polymerized in the presence of a latex of a rubbery polymer having a particle size ($D_w$) of not more than 0.25 micron (weight average) to produce grafting on the rubbery polymer of at least a portion of the polymer being formed, the superstrate to substrate ratio being 45–100:100. There is then recovered a polyblend with a matrix of a polymer containing the vinylidene monomer and the two graft copolymers produced upon the two sizes of rubbery polymers, the two graft copolymers being present in an amount of 1.0–70.0 percent by weight of the polyblend and the small particle graft copolymer comprising 55.0–85.0 percent by weight of the combined weight of the graft copolymer components.

In accordance with the preferred embodiment of the present invention, the polymerizable monomer formulation is comprised at least principally of a monovinylidene aromatic hydrocarbon and an ethylenically unsaturated nitrile. Preferably the monovinylidene aromatic hydrocarbon is styrene and the nitrile monomer is acrylonitrile. The preferred embodiment of the present invention utilizes as the rubbery polymers those which contain at least 75.0 percent by weight of a conjugated 1,3-diene.

The agglomerated rubbery polymer preferably has a particle size of 0.4–0.6 micron and the small particle rubbery polymer has a particle size of about 0.15–0.25 micron. Desirably, the amount of the agglomerated rubbery polymer is equal to about 20–40 percent by weight of the small particle rubbery copolymer. The total amount of rubbery polymers in the polyblend comprises about 2–50 percent by weight thereof.

Preferably, the small particle graft copolymer has a superstrate to substrate ratio of about 60–80:100 and the agglomerated graft copolymer has a superstrate to substrate ratio of about 20–40:100.

The small particle rubbery polymer desirably contains a diene monomer component and both rubbery polymers contain at least 70 percent by weight of a conjugated 1,3-diene in accordance with the preferred embodiment of the present invention.

In the normal situation, the superstrate polymers of the two graft copolymers have essentially the same chemical composition and are of substantially the same molecular weight. This is readily achieved by the practice of the present invention in which both of the rubbery polymers are grafted in a single reaction vessel during the same polymerization cycle. Generally, the agglomerated rubbery polymer will be added to the emulsion of the small particle rubbery polymer and polymerizable monomer formulations; since it is grafted to a lower level, it will be added at a later stage in the polymerization with other advantages to be described hereinafter. Although the process of grafting will normally produce some volume of matrix polymer, normally the graft copolymers will be blended with a separately formed matrix polymer prior to recovery of the polyblend.

The theory of the present invention is not understood, but it is believed that the use of a substantially monodisperse large particle size rubbery polymer minimizes the adverse effect upon balance of properties. When conventional polydisperse or broadly dispersed agglomerated rubbery polymers are employed, the properties are far more sensitive to the amount of the large particle component. It is possible that the monodisperse character of the large particle of the present invention provides greater homogeneity of distribution of the two types of particles within the matrix and thus achieves the optimum benefits sought by Aubrey in the aforementioned U.S. Pat. No. 3,509,237.

DETAILED DESCRIPTION OF THE EMBODIMENTS OF THE INVENTION

As has been pointed out previously, the process of the present invention requires graftable rubbery polymer substrates and vinylidene monomer formulations. In addition, latex stabilizers are required and various other components are utilized to obtain the desired results. These various components will be discussed hereinafter in detail.

The rubber substrate

Various rubbers onto which the monomers may be grafted during the polymerization in the presence thereof are utilizable as the substrate of the graft copolymers including conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene-1,3 in order to facilitate grafting thereof. This diene monomer component will normally comprise 1 to 20 percent by weight and preferably 2 to 8 percent by weight of the ethylene/propylene/diene terpolymer or acrylate copolymer rubber.

The preferred rubbers are diene rubbers of mixtures of diene rubbers, i.e., any rubbery polymers (a polymer having a second order transition temperature not higher than −20° centigrade, as determined by ASTM Test D-746-52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturable monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; and alpha - alkylstyrene, such as alphamethylstyrene, alpha-ethylstyrene, alpha-methyl-m-methylstyrene, etc.; vinyl naphthalene, etc.); arhalo monovinylidene aromatic hydrocarbons (e.g. the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, excessive cross-linking can result in loss of the rubbery characteristics. However, cross-linking of the rubber graft is desirable to preserve proper morphology of the particles thus produced. Accordingly, some cross-linking during the grafting reaction is advantageous and inherent cross-linking can be further encouraged through the variation of graft polymerization conditions as is well known in the art. Thus, rubber graft particles of spherical form and proper size may be obtained and maintained even during mechanical processing to achieve the desired dispersion thereof in the rigid matrix when such a technique is employed. The cross-linking agent can be any of the agents conventionally employed for cross-linking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 70 to 100 percent by weight of butadiene and/or isoprene and up to 30 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

POLYMERIZABLE VINYLIDENE MONOMER FORMULATIONS

The polymerizable monomer formulation will, of course, contain the monomers to be polymerized, initiator where required, and other desirable components such as stabilizers, molecular weight regulators, etc.

The specific monomers will, of course, vary with the desired product. However, the process is highly advantageously employed in the manufacture of styrene-type polyblends, i.e., polymerizable monomer formulations containing monovinylidene aromatic hydrocarbons either alone or in combination with other copolymerizable monomers such as unsaturated nitriles. Where a styrene-type monomer is employed solely, then the resultant product will be of the type known as an "impact styrene." Where styrene and acrylonitrile-type monomers are employed jointly in the polymerizable formulation, the resulting product will be of the type known as "ABS." However, it should be understood that the composition of the polymerizable formulation may vary widely.

Exemplary of the monovinylidene aromatic monomers that may be homopolymerized or interpolymerized are styrene; alpha-alkyl monovinylidene monoaromatic compounds, e.g., alpha-methylstyrene, alpha-ethylstyrene, alpha-methylvinyltoluene, alpha-methyl dialkylstyrene, etc.; ring-substituted alkyl styrene, e.g., vinyl toluene, o-ethylstyrene, p-ethylstyrene, 2-4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halo-substituted styrenes, e.g., 2-chloro-4-methylstyrenes 2,6-dichloro-4-methylstyrene, etc.; vinyl naphthalene; vinyl anthracene, etc. The alkyl substituents generally have one to four carbon atoms and may include isopropyl and isobutyl groups. If so desired, mixtures of such monovinylidene aromatic monomers may be employed.

Exemplary of other vinylidene monomers that may be employed solely or interpolymerized with monovinylidene aromatic monomers are ethylenically unsaturated nitriles, such as acrylonitrile, methacrylonitrile, ethacrylonitrile and mixtures thereof; conjugated 1,3-dienes, e.g., butadiene, isoprene, etc.; alpha- or beta-unsaturated monobasic acids and derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide; vinyl esters such as vinyl acetate, vinyl propionate, etc.; dialkyl maleates or fumarates such as dimethyl maleate, diethyl maleate, dibutyl maleate, the corresponding fumarates, etc. As is known in the art, the amount of various of the foregoing materials useful as comonomers in an interpolymer will vary.

The preferred vinylidene monomer formulations of the present invention consist at least principally of a monovinylidene aromatic hydrocarbon and an ethylenically unsaturated nitrile, i.e., such monomers comprise at least 50.0 percent by weight and preferably at least 75.0 percent by weight of the formulation. Most desirably, such monomers comprise at least 90.0 percent by weight of the formulation and the usual commercial compositions are substantially completely comprised of such monomers although minor amounts, i.e., less than 5.0 percent by weight of other components such as chain transfer agents, modifiers, etc., may be included.

These preferred polymerizable monomer mixtures contain at least 10 percent by weight of the monovinylidene aromatic hydrocarbon monomer and preferably at least 50 percent by weight thereof. They also contain at least 5 percent by weight of the unsaturated nitrile and preferably at least 10 percent by weight thereof. From the standpoint of highly advantageous commercial practice, to produce advantageous ABS products, the monomer formulations contain 20 to 95 percent, and preferably 60 to 85 percent, by weight of the monovinylidene aromatic hydrocarbon and 80 to 5 percent, and preferably 40 to 15 percent, by weight of the unsaturated nitrile.

Agglomeration of the rubber latex

As has been indicated, a latex having a particle size of less than 0.25 micron is agglomerated to provide a particle size of 0.35–1.0 micron (weight average). The highly advantageous acidulation technique of the present invention is the subject of copending U.S. application Ser. No. 677,078, filed Oct. 23, 1967 by William O. Dalton, now U.S. Pat. 3,558,541, granted Jan. 26, 1971. In this process, an organic acid anhydride is added to a rubber latex and dispersed therein before substantial hydrolysis of the anhydride occurs. The latex uses as the emulsifier a soap (or salt) of an organic fatty acid having an ionization constant lower than that of the acid of the anhydride. The mixture is then allowed to stand with minimal agitation until the anhydride hydrolyzes to provide free acid which attacks the emulsifying agent and causes agglomeration of the rubbery particles. Substantial agitation during this portion of the process is avoided to prevent coagulation. After the desired particle size has been obtained, the latex is stabilized by the addition of an acid-stable emulsifying agent or by the regeneration of the fatty acid soap through the addition of an alkali.

The acid anhydride preferably employed is acetic anhydride although maleic acid anhydride and propionic acid anhydride have also been employed advantageously. Generally, the amount of anhydride employed will be at least one-tenth the stoichiometric equivalent of the emulsifying agent (a molar ratio of 1:20 since there are two acid radicals). Normally, the amount employed is at least one-fourth the stoichiometric equivalent and preferably the amount added is in excess of the stoichiometric amount of the emulsifying agent. However, amounts in excess of five times the equivalent provide no additional benefit and may interfere with the stability of the agglomerated latex or with the properties of the polymer by introducing excessive acidity or corrosive action.

The time for agglomeration will vary with temperature, the amount of anhydride and emulsifying agent, the rate of hydrolysis of the anhydride, the nature of the rubbery polymer, the initial and desired sizes of the particles, etc. Periods of five minutes to ten hours may be employed, with normal times of about five minutes to two hours being employed at ambient temperatures.

After the agglomeration reaction has taken place, the latex is stabilized by the addition of an acid-stable emulsifier or by the regeneration of the initial soap emulsifier through the addition of a basic compound to neutralize the acid. Anionic emulsifying agents such as alkali metal salts of long chain sulfonic acids and non-ionic emulsifying agents such as ethoxylated octyl phenol have been employed successfully. An alkali metal hydroxide or other basic compound such as a carbonate may be added to regenerate the fatty acid soap; the amount added will normally be the stoichiometric equivalent of the acid anhydride although lesser amounts may be employed with some lessening in stability of the latex.

Further information considering this highly advantageous agglomeration process may be found in the aforementioned application of William O. Dalton. In addition, the agglomerating effect of the acid anhydride may be potentiated by the prior addition to the latex of an inorganic electrolyte such as alkali metal halide. This procedure is described in the copending application of William O. Dalton, Ser. No. 694,870, filed Jan. 2, 1968, now U.S. Pat. 3,551,370, granted Dec. 29, 1970.

Graft polymerization process

The graft copolymer is prepared by polymerizing the monomer formulation in the presence of the preformed rubber substrate, generally in accordance with conventional graft polymerization techniques. In such graft polymerization, the preformed rubbery polymer substrate generally is dispersed with the monomer in the latex and this admixture is polymerized to combine chemically or graft at least a portion of the polymer upon the rubber substrate. Depending upon the ratio of monomers to rubbery substrate and polymerization conditions, it is possible to produce both the desired degree of grafting of the polymer onto the rubbery substrate and the polymerization of ungrafted polymer to provide the desired amount of matrix polymer at the same time. Normally, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., also exert an effect.

The initiator or catalyst is generally included within the range of 0.001 to 1.0 percent by weight, and preferably on the order of 0.005 to 0.5 percent by weight of the polymerizable monomer, depending upon the monomers and the desired polymerization cycle. The initiator may be added incrementally to facilitate optimum grafting.

As is well known, it is often desirable to incorporate molecular weight regulators such as mercaptans, halides and terpenes in relatively small percentages by weight, on the order of 0.001 to 2.5 percent by weight of the polymerizable monomer. In addition, it may be desirable to include relatively small amounts of antioxidants or stabilizers such as the conventional alkylated phenols, although these may be added during or after polymerization.

In the polymerization process, monomer formulation and rubbery substrate latex are emulsified in water by use of suitable emulsifying agents such as fatty acid soaps, alkali metal or ammonium soaps of high molecular weight alkyl or alkaryl sulfates or sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 0.1 to 15 parts by weight per 100 parts by weight of the monomer formulation and water is provided in an amount of about 1 to 4 parts per part of monomer formulation, and even in larger ratios where greater dilution is desirable.

If so desired, the aqueous latex formed in the emulsion polymerization of the rubbery substrate may provide the aqueous medium into which the monomer formulation is incorporated with or without additional emulsifying agents, water, etc. However, the rubbery polymer may be dissolved in the monomer formulation and the mixture emulsified, or a latex thereof may be separately prepared.

Various water soluble free radical polymerization initiators are conventionally used for emulsion polymerization of the rubber monomers including conventional peroxy and azo catalysts, and the resultant latex containing residual initiator may be used as the aqueous medium with which the polymerizable monomers are mixed. Usually additional initiator will be added for graft polymerization. Exemplary of peroxy catalysts are the alkali metal peroxides, persulfates, perborates, peracetates and percarbons, and hydrogen peroxide. If so desired, the initiator may be activated to form a redox system. In addition, it may be advantageous to include an oil-soluble initiator such as di-tert-butyl peroxide, benzoyl peroxide, lauroyl peroxide, oleyl peroxide, toluyl peroxide, di-tert-butyl-diperphthalate, tert-butyl peracetate, tert-butyl perbenzoate, dicumyl peroxide, tert-butyl peroxide, isopropyl peroxy dicarbonate, 2,5-dimethyl-2,5-di-(tert-butylperoxy) hexane, 2,5-dimethyl-2,5-di(tert-butyl peroxy)-hexane-3, tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethyl-hexane-2,5-dihydroperoxide, etc., and mixtures thereof. However, other free-radical generating catalysts may be employed such as actinic radiation.

The latex of the rubbery polymer and the monomer formulation is polymerized in an inert atmosphere at temperatures in the range of 20–100° centigrade with agitation. Pressures of 1–100 lbs. per square inch may be employed. Although the entire amount of the monomer formulation may be present at the time that polymerization is commenced, generally it is preferable to add the monomer formulation either continuously or in increments over a portion of the polymerization cycle. Normally, additional initiator is added incrementally or continuously over that portion of the cycle during which the monomer formulation is being added. Polymerization is continued until substantially all, i.e., more than 90 percent, of the monomers have been polymerized. The remaining monomer formulation or other volatile components are then distilled from the latex which is dewatered, washed and dried. The latex may be dewatered by spray drying, by coagulation through the addition of salts, etc.

The total amount of monomer formulation to be added will normally amount to 50–250 parts monomer per 100 parts total rubbery polymer and preferably about 80–200 parts per 100 parts total rubbery polymer. The actual amount of monomer formulation added will vary dependent upon the grafting efficiency of the reaction and the desired superstrate to substrate ratio for the graft copolymers formed by the two different particle size rubbers.

In accordance with the preferred aspect of the present invention, the two rubbery polymers are grafted in a single reaction vessel in the course of a single reaction cycle. In grafting large particle agglomerate lattices, there has been observed a tendency for instability during grafting and this is readily overcome by use of the process of Emory A. Ford and Speros P. Nemphos described and claimed in their copending application, Ser. No. 48,563, filed June 22, 1970, entitled Process for Making Novel Graft Copolymer Blends and Blends Produced Thereby. As described therein, an emulsion of the small particle rubbery polymer and vinylidene monomer formulation is subjected to polymerization conditions to produce grafting onto the rubbery polymer of at least a portion of the vinylidene polymer being formed. Subsequent to commencement of polymerization, the agglomerated rubbery polymer is added and polymerization is continued to produce grafting thereonto of at least a portion of the vinylidene polymer being formed. In this manner, both rubbery polymers are grafted with essentially the same polymer although the superstrate to substrate ratio may be varied readily.

Details of the process may be found in the copending application but some additional description will be provided hereinafter. The polymerization cycle will normally range from 2–10 hours and preferably 4–6 hours. In accordance with the preferred procedure, the monomer formulation is added over approximately $\frac{2}{6}$–$\frac{5}{6}$ of the total polymerization cycle. Although this addition may take the form of increments of varying size, the preferred technique utilizes substantially continuous addition at a relatively constant rate over $\frac{1}{2}$–$\frac{3}{4}$ of the cycle.

The agglomerated or large particles size rubber latex is added to the partially polymerized mixture after a substantial portion of the monomer formulation has been grafted upon the small particle rubbery polymer. Normally, this point of addition will occur after there have been polymerized at least about 35 parts of monomer formulation per 100 parts of small particle rubbery polymer and preferably after at least about 50 parts of monomer formulation per 100 parts of small particle rubbery polymer have been polymerized. The actual point for the addition of the large rubbery polymer latex will vary upon the amount of grafting thereof desired and the total amount of monomer formulation to be polymerized in the presence of the two rubbery polymers. However, it is generally desirable to add the large particle rubbery polymer after the polymerization cycle is at least 30 percent completed and preferably at about 50–75 percent completion.

Effect of particle size on graft ratio

Generally, the particle size of the rubbery polymer has an effect upon the optimum grafting level for the large particle graft copolymer and to a lesser extent on the optimum grafting level for the small graft copolymer. As will be readily appreciated, a given weight percentage of smaller size rubber particles will provide considerably greater surface area for grafting than the equivalent weight of a larger size rubber particle. Accordingly, the density of grafting produced by a given weight of graft superstrate will vary depending upon the size of the rubber particle. An excessive graft level is to be avoided with respect to the large particle rubber since it will adversely affect its contribution to impact resistance.

Normally, the small particle rubber is relatively highly grafted with the conditions being selected so as to produce a superstrate to substrate ratio of 45–100:100 and preferably 60–80:100, depending upon the particle size. The large particle rubber is relatively lightly grafted with the polymerization conditions and the time of addition being selected to produce a superstrate to substrate ratio of about 10–45:100 and preferably 20–40:100.

The polymer blend

As will be readily appreciated, the rubber content of the polymer blend produced by the graft polymerization process of the present invention may be in excess of that desired for the final product since economics generally dictate the use of high rubber levels in the graft polymerization reaction. Accordingly, the graft polymerization blend resulting from the graft polymerization reaction will normally be blended with a vinylidene polymer of similar composition to increase the amount of matrix polymer and reduce the rubber level. This resinous polymer used for dilution of the graft copolymer may be produced by an emulsion process so that the latex thereof may be combined with the latex from the graft polymerization process and the mixed latex co-coagulated. Alternatively, the recovered graft copolymer may be admixed with a separately formed resinous polymer produced by emulsion, suspension or mass polymerization techniques.

Generally, the final polymer blends will contain 2–50 percent by weight of the total of the two rubber components. Increasing the total amount of rubber graft in the composition while maintaining the ratio of the large to small particle graft components constant generally increase the Izod impact strength of the composition but rapidly increases the viscosity of the blend and decreases the tensile strength at yield and fail and the tensile modulus. Accordingly, the preferred blends contain about 7–35 percent by weight of the combined graft copolymers (based upon rubber( and most desirably about 13–25 percent by weight thereof.

Exemplary of the efficacy of the present invention are the following specific examples wherein all parts are parts by weight unless otherwise indicated.

EXAMPLE 1

A latex of butadiene/acrylonitrile copolymer (93:7) having a particle size (weight average) of 0.08 micron and containing 40 percent solids is admixed with water in the ratio of 380 parts water to 293 parts rubber latex. To this emulsion over a period of four hours are added a mixture of 195 parts of styrene/acrylonitrile monomer (70:30) and 1.3 part of terpinolene and 98 parts of a 2 percent aqueous solution of potassium persulfate. During the period, the emulsion is maintained under an atmosphere of nitrogen with stirring and the temperature is held at 75° centigrade.

A second graft copolymer is prepared using as a substrate a butadiene/styrene copolymer (90:10) having a weight average particle size of 0.5 micron and a broad particle size distribution ranging from 0.1–1.0 micron. This is a commercially available rubber latex sold by Goodyear under the designation "6282." A mixture of styrene/acrylonitrile (70:30) is added to the latex in an amount sufficient to provide 30 parts monomer per 100 parts rubber and the polymerization process is similar to that described hereinbefore so as to produce high grafting efficiency. The graft copolymer is recovered by coagulation with magnesium sulfate and is washed and dried.

The two graft copolymers are then blended with a styrene/acrylonitrile copolymer (67:33) prepared by suspension polymerization to provide a total rubber content of 23 percent by weight and in which the product of the second graft polymerization reaction comprises 30 percent of the graft copolymer components. Test specimens are made therefrom and physical tests are conducted. The Izod impact value is found to be 6.1 foot/pounds per inch of notch; the Hunter gloss (peak) is 90 as compared with a control of 75 for a commercial product and the falling dart value at 0° centigrade is 27 foot/pounds.

EXAMPLE 2

The procedure of Example 1 is substantially repeated except that the large particle latex is a butadiene/acrylonitrile copolymer (93:7) having a particle size of 0.05 micron which is agglomerated by acetic anhydride to 0.7 micron ($D_w$) and a narrow particle size distribution with over 70 percent of the particles lying within the range of 0.5–0.8 micron. This rubber latex is grafted in a manner similar to the procedure of Example 1 with 40 parts per 100 parts rubber solids of a styrene/acrylonitrile mixture (70:30). The graft superstrate to substrate ratio is determined to be 35:100.

The two graft copolymer components and matrix interpolymer are blended in the manner of Example 1 to a 23 percent total rubber content, and test specimens are made therefrom. Upon physical testing, the falling dart value at 0° centigrade is found to be 59 foot/pounds; the Izod impact value is 8.0 foot/pounds per inch notch and the Hunter gloss (peak) is 74 (as compared with a control of 70). Thus, it can be seen that the use of the monodispersed rubber latex significantly enhances the falling dart impact value.

EXAMPLE 3

A latex of butadiene/acrylonitrile copolymer (93:7) having a particle size (weight average) of 0.05 micron is agglomerated with acetic anhydride to a particle size of 0.4 micron with a final solids content of about 31 percent.

A latex of a butadiene/styrene rubber copolymer (90:10) having an average particle size of 0.12 micron is admixed with water to provide an emulsion. The amount of water is calculated to provide a final solids content at the end of polymerization of 38 percent. To this latex over a period of five hours is added 125 parts of a styrene/acrylonitrile monomer mixture (70:30) with the initial rubber latex providing 64.5 parts rubber. In addition, 1.6 parts terpinolene are added over the same period together with potassium persulfate as the initiator. At the end of 3.5 hours, a latex containing 35.5 parts of the agglomerated rubber is added and the temperature is raised to 75° centigrade. Following the completion of the addition of the monomer formulation, the emulsion is held at temperature for an additional period of two hours. The emulsion is then coagulated by freezing, washed and dried.

The graft copolymer is blended with the styrene/acrylonitrile copolymer of Example 1 to a rubber level of 17 percent. Test specimens are prepared therefrom and subjected to physical testing. The Izod impact value is 4.3 foot/pounds per inch of notch; the Hunter gloss (peak) is 62; and the falling dart impact value at 0° centigrade is 24 foot/pounds.

Thus it can be seen that the present invention provides a novel polyblend of emulsion polymerized graft copolymers having different particle sizes and affording a highly desirable balance of properties over that which might be obtained by use of conventional, broadly dispersed agglomerated rubber latices. The process for making the polyblends is relatively simple and economical in operation and is readily adapted to facile variation since the components may be grafted individually or preferably separately in accordance with the aforementioned co-pending application of Ford et al.

What is claimed is:

1. In a process for making a polyblend, the steps comprising:
   (A) agglomerating an aqueous latex of a rubbery polymer having a diene monomer component and selected from the group consisting of diene rubbers, ethylene/propylene rubbers and acrylate rubbers, by
      (i) adding thereto of a water soluble organic acid anhydride having an ionization constant which is higher than that of the organic fatty acid used in a soap emulsifying agent for the latex,
      (ii) allowing the latex to stand to permit agglomeration of the rubber particles to a size ($D_w$) of 0.35–1.0 micron (weight average) with a narrow particle size distribution in which at least 70 percent of the particles are within the range of 0.75 $D_w$ to 1.2 $D_w$, and
      (iii) stabilizing the agglomerated latex with emulsifying agent;
   (B) polymerizing in the presence of said agglomerated latex a polymerizable vinylidene monomer formulation to produce grafting on the rubbery polymer of at least a portion of the vinylidene polymer being formed, the superstrate to substrate ratio being 10–45:100, said vinylidene monomer formulation being comprised at least principally of monomers selected from the group consisting of monovinylidene aromatic hydrocarbons, ethylenically unsaturated nitriles, conjugated 1,3-dienes, acrylic acid and its esters and amides, alkacrylic acids and their esters and amides, vinyl esters, dialkyl maleates, dialkyl fumarates, and mixtures thereof;
   (C) polymerizing in the presence of a latex of a rubbery polymer with a diene monomer component and selected from the group consisting of diene rubbers, ethylene/propylene rubbers and acrylate rubbers and having a particle size ($D_w$) of not more than 0.25 micron (weight average) a polymerizable monomer formulation containing said vinylidene monomer of said vinylidene monomer formulation so as to produce grafting on said rubbery polymer of at least a portion of the vinylidene polymer being formed, the superstrate to substrate ratio being 45–100:100; and
   (D) recovering a polyblend with a matrix of a polymer containing the vinylidene monomer and the two graft copolymers produced from the two sizes of rubbery polymers, the two graft components being present in an amount 1.0 to 70.0 percent by weight of the polyblend and the small particle graft copolymer comprising 55.0 to 85.0 percent by weight of the combined weight of the graft copolymer components.

2. The process in accordance with claim 1 wherein said polymerizable vinylidene monomer formulation is comprised at least principally of a monovinylidene aromatic hydrocarbon and an ethylenically unsaturated nitrile.

3. The process in accordance with claim 1 where both of said rubbery polymers contain at least about 70 percent by weight of conjugated 1,3-diene.

4. The process in accordance with claim 1 wherein said agglomerated rubbery polymer has a particle size ($D_w$) of 0.4–0.6 micron and wherein said second mentioned rubbery polymer has a particle size ($D_w$) of 0.15–0.25 micron.

5. The process in accordance with claim 4 wherein said graft copolymer produced from the agglomerated rubbery polymer has a superstrate to substrate ratio of 20–40:100 and wherein said graft copolymer produced by the second mentioned rubbery polymer has a superstrate to substrate ratio of 60–80:100.

6. The process in accordance with claim 1 wherein the superstrate polymers of said graft copolymers are of essentially the same chemical composition and substantially the same molecular weight.

7. The process in accordance with claim 1 wherein said graft copolymers are blended with a separately formed matrix polymer prior to recovery of the polyblend.

8. The process in accordance with claim 2 wherein said monovinylidene aromatic hydrocarbon is styrene and said unsaturated nitrile is acrylonitrile.

9. A composition comprising a polyblend of:
   (A) a matrix of a polymer comprised at least principally of a vinylidene monomer selected from the group consisting of monovinylidene aromatic hydrocarbons, ethylenically unsaturated nitriles, conjugated 1,3-dienes, acrylic acid and its esters and amides, alkacrylic acids and their esters and amides, vinyl esters, dialkyl maleates, dialkyl fumarates, and mixtures thereof;
   (B) a first graft copolymer having a rubber substrate with a diene monomer component selected from the group consisting of diene rubbers, ethylene/propylene rubbers and acrylate rubbers and a superstrate of a polymer containing said vinylidene monomer, the rubber substrate of said first graft copolymer having a particle size ($D_w$), based upon weight average, of not more than 0.25 micron; and
   (C) a second graft copolymer having a rubber substrate with a diene monomer component and a superstrate of a polymer containing said vinylidene monomer, said rubber substrate being selected from the group consisting of diene rubbers, ethylene/propylene rubbers and acrylate rubbers, the rubber substrate of said second graft copolymer having a particle size ($D_w$), based upon weight average, of 0.35–1.0 micron, said rubber substrate of said second graft copolymer being an agglomerate of smaller particles and having a narrow particle size distribution with at least 70 percent by weight thereof being within the range of 0.75 $D_w$–1.2 $D_w$, both of said graft copolymers being emulsion graft copolymers, said first graft copolymer having a superstrate to substrate ratio of 45–100:100 and said second graft copolymer having a superstrate to substrate ratio of 10–45:100, said graft copolymers combined comprising 1.0–70.0 percent by weight of said polyblend and said first graft copolymer comprising 55.0–85.0 percent by weight of the combined weight of said graft copolymers.

10. The composition of claim 9 wherein said polymers of the matrix and of the first and second graft copolymers are each comprised at least principally of a monovinylidene aromatic hydrocarbon and an ethylenically unsaturated nitrile.

11. The composition of claim 9 wherein said rubber substrate of said first graft copolymer has a particle size of 0.15–0.25 micron and said rubber substrate of said second graft copolymer has a particle size of 0.4–0.6 micron.

12. The composition of claim 9 wherein both of said rubber substrates contain at least about 70 percent by weight of conjugated 1,3-diene.

13. The composition of claim 12 wherein the polymers of said matrix and of said first and second graft copolymers are each comprised at least principally of a monovinylidene aromatic hydrocarbon and an ethylenically unsaturated nitrile.

14. The composition of claim 9 wherein the first graft copolymer has a superstrate to substrate ratio of about 60–80:100 and wherein the second graft copolymer has a superstate to substrate ratio of about 20–40:100.

15. The composition of claim 9 wherein said polyblend is produced in accordance with the method of claim 1.

(References on following page)

References Cited

UNITED STATES PATENTS 3,509,237  4/1970  Aubrey _____ 260—876
3,558,541  1/1971  Dalton _____ 260—880 X
3,509,238  4/1970  Aubrey et al. _____ 260—876

MURRAY TILLMAN, Primary Examiner
H. ROBERTS, Assistant Examiner

U.S. Cl. X.R.

260—23.7 A, 29.7 UP, 878 R, 879, 880 R